(No Model.)
M. F. DEININGER.
AXLE BOX.
No. 537,759. Patented Apr. 16, 1895.
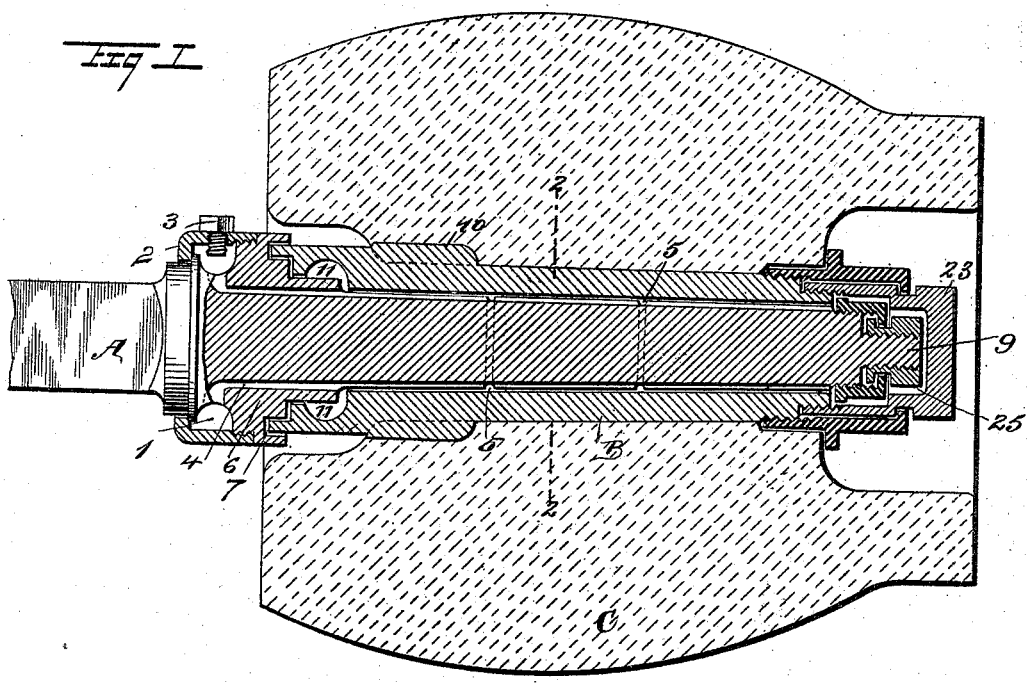
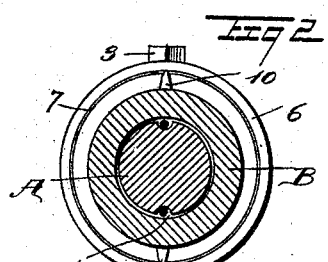
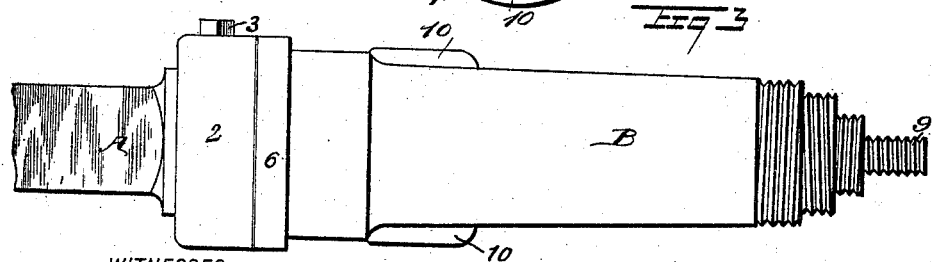
WITNESSES:
H. Walker
John Lotka
INVENTOR
M. F. Deininger
BY
Munn & Co.
ATTORNEYS.
THE NORRIS PETERS CO., PHOTO-LITHO., WASHINGTON, D. C.

UNITED STATES PATENT OFFICE.

MICHAEL F. DEININGER, OF BROOKLYN, NEW YORK.

AXLE-BOX.

SPECIFICATION forming part of Letters Patent No. 537,759, dated April 16, 1895.

Application filed June 1, 1894. Serial No. 513,170. (No model.)

*To all whom it may concern:*

Be it known that I, MICHAEL F. DEININGER, of Brooklyn, in the county of Kings and State of New York, have invented certain new and useful Improvements in Axle-Boxes, of which the following is a specification.

My invention relates to improvements in axle boxes and more particularly refers to improved means for lubricating the same, and such invention therefore has for its object to provide an axle box of a simple and economic structure in which the lubricating means are so arranged as to provide for an easy lubrication of the axle from an opening therein.

With other objects in view which will hereinafter appear the invention consists in such novel features of construction and peculiar combination of parts as will be first described in detail and then pointed out in the claim, reference being had to the accompanying drawings, in which—

Figure 1 is a longitudinal section of my improvements as applied for use. Fig. 2 is a cross section thereof taken on line 2—2 Fig. 1, and Fig. 3 is a side elevation of the axle and axle box, the locking nut being removed.

In the accompanying drawings A indicates the axle which is provided with a recess 1 covered by a cap 2, thereby forming an annular chamber adapted to contain the lubricant.

A screw plug 3 covers the opening through which the lubricant is applied.

Channels 4 extend longitudinally of the axle, and communicate with the lubricant chamber 1, and annular channels 5 connect such longitudinal channels 4.

Adjacent to the chamber 1 the axle is provided with a collar or boss 6, preferably formed with a circular groove 7, to receive one end of the axle box B. The opposite end of the axle is provided with nut locking devices which may be constructed as shown, or may be of any approved construction.

The axle box B is provided with longitudinal ribs 10 or equivalent parts, to prevent the hub C from turning relatively to the axle box, and near the end which is adapted to engage the groove 7 of the axle A, such box may be provided with an interior recess 11 whereby another lubricant chamber is formed.

From the foregoing taken in connection with the drawings it will be readily understood that the arrangement of the several parts is such that the lubricant will be evenly and economically distributed over the axle, the lubricant passing from the chamber 1 into the grooves 4 and 5, and when provided with a second chamber 11, a collection chamber is provided which will serve to assist in the even distribution of the lubricant as it passes out of the chamber 1, it forming as it were, a check for too quick a distribution for such chamber 1.

A nut 23 screws on the outer end of the axle box B, closing the same against escape of oil, and such nut is preferably spaced from the end 9 of the axle A to provide a chamber or passage 25 which connects the longitudinal channels 4.

What I claim as my invention, and desire to secure by Letters Patent, is—

The combination, with the axle having an annular recess, a cap to cover the recess and form an annular chamber, the cap being provided with an aperture through which a lubricant may be supplied, the axle also having longitudinal channels communicating with the said chamber, and a collar adjacent to the said chamber, of the axle box adapted to abut against the said collar, and provided adjacent thereto with an interior recess in its interior surface, substantially as described.

MICHAEL F. DEININGER.

Witnesses:
JOSEPH T. O'NEILL,
JOHN A. RIPP.